W. A. STARCK.
CLAMP.
APPLICATION FILED AUG. 23, 1921.
1,414,756.
Patented May 2, 1922.
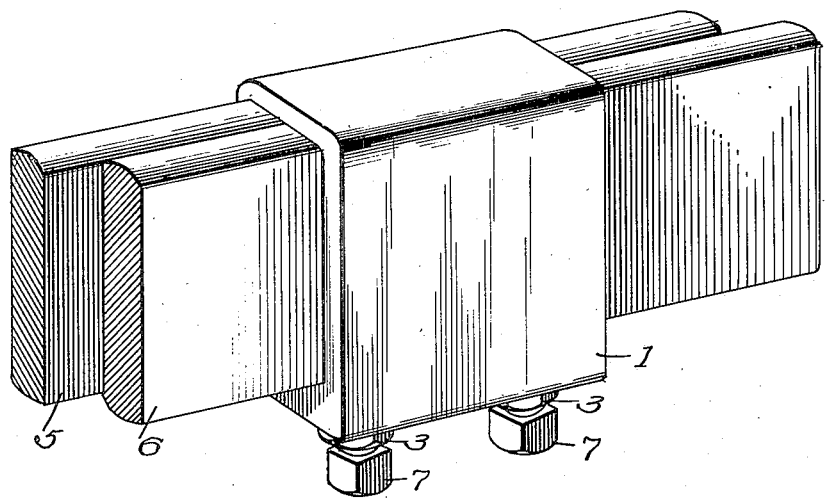
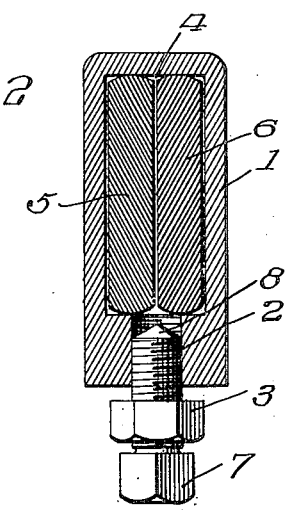
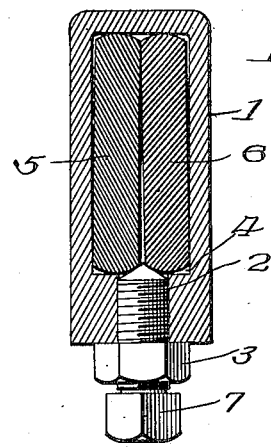
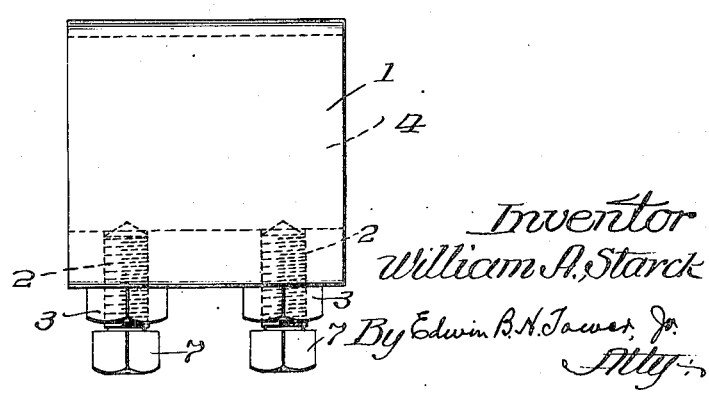
Inventor
William A. Starck
By Edwin B. H. Tower, Jr.
Atty.

UNITED STATES PATENT OFFICE.

WILLIAM A. STARCK, OF MILWAUKEE, WISCONSIN, ASSIGNOR TO BADGER MANUFACTURING CORPORATION, OF MILWAUKEE, WISCONSIN, A CORPORATION OF DELAWARE.

CLAMP.

1,414,756.      Specification of Letters Patent.      Patented May 2, 1922.

Application filed August 23, 1921. Serial No. 494,702.

*To all whom it may concern:*

Be it known that I, WILLIAM A. STARCK, a citizen of the United States, residing at Milwaukee, in the county of Milwaukee and State of Wisconsin, have invented new and useful Improvements in Clamps, of which the following is a specification.

This invention relates to a clamp.

It is particularly applicable for clamping together two spring bars of an automobile bumper, although not limited to such use.

An object of the invention is to provide a simple rugged, durable and efficient clamp of few parts which may be manufactured at comparatively low cost.

Another object is to provide a clamp wherein the possibility of loosening is reduced.

Another object is to provide a clamp wherein rattling is eliminated or reduced.

Other objects and advantages will hereinafter appear.

In accordance with the invention the clamp, in general, comprises a collar having an opening for receiving the members to be clamped together and a wedge for engaging adjacent edges of said members and forcing the same into wedging contact with the embracing collar.

An embodiment of the invention is illustrated in the accompanying drawings, wherein:

Figure 1 is a perspective of the clamp holding together two spring bars of an automobile bumper.

Figure 2 is a transverse vertical section through the clamp with the wedge in non-engaging position.

Figure 3 is a similar section of the clamp with the wedge in clamping position.

Figure 4 is a side elevation of the clamp.

The clamp comprises a holding collar 1, a plurality of set screws 2 threaded therein and lock nuts 3 for locking the set screws in clamping position.

The collar 1 has a rectangular opening 4 therein for receiving two spring bars 5 and 6 of an automobile bumper, or other members, which are to be clamped and held in relatively fixed relation by means of the clamp.

Each set screw 2 is threaded into an opening provided in the bottom of the collar and is provided with a square head 7 so as to be engaged by a wrench for tightening the set screw.

The tip 8 of each set screw is cone-shaped thus forming a conical wedge adapted to engage adjacent edges of the two spring bars 5 and 6 as the set screw is screwed into the threaded opening in the collar.

The wedge 8 as it engages adjacent edges of the two spring bars enters for a short distance the limited space between the adjacent bars and thus forces apart the lower edges of the bars. The upper edges of the two spring bars are thus forced into wedging contact with the top of the collar while the lower outer corners of the spring bars are forced into wedging contact with the side walls of the collar.

Consequently, when the set screws have been properly tightened the two spring bars are wedgingly clamped by the wedge 8 within the collar of the clamp.

After the two spring bars have been thus clamped together the lock-nuts 3 may be drawn up against the lower end of the collar to lock the set screws and prevent loosening thereof under vibration to which the automobile bumper is subject.

Of course, other means may be employed to force the wedge into wedging engagement with the spring bars or other members to be clamped together.

The collar of the clamp confines the spring bars or other members of the clamp together while the wedge forces such confined bars into wedging contact with the embracing collar, thus tightly clamping and holding the two bars in fixed relation.

The pitch of the threads on the set screw may be low so that as the set screw is tightened a powerful clamping or wedging action is exerted between the wedge 8 against the two bars.

This clamp while comparatively small effectively holds the two bars in fixed relation so that the same are not readily displaced.

The invention contained herein is, of course, susceptible of other embodiments and adaptations.

The invention claimed is:

1. A clamp comprising a collar for embracing two members which are to be clamped and held in fixed relation, and a set screw threaded into the collar and having a tip for engaging adjacent edges for the two members thereby to wedge the same within the collar.

2. A clamp comprising a collar for embracing two members which are to be clamped and held in fixed relation, and means carried by the collar and adapted to engage adjacent edges of the two members thereby to wedge the same within the collar.

3. A clamp comprising a collar for embracing two members which are to be clamped and held in fixed relation, and a wedge adapted to be forced between adjacent edges of the two members whereby the members may be wedgingly clamped within the collar.

4. A clamp comprising a collar having an opening therein for receiving two members which are to be clamped and held in fixed relation, a wedge adapted to be forced between adjacent edges of the two members whereby the members may be wedgingly clamped within the collar, and means carried by the collar for forcing the wedge between the two members.

5. A clamp having in combination a collar provided with an opening for receiving two members which are to be clamped and held in fixed relation, and a set screw threaded into the collar and provided with a cone-shaped tip for engaging adjacent edges for the two members to wedge the same within the collar.

6. A clamp having in combination a collar provided with an opening for receiving two members which are to be clamped and held in fixed relation, a wedge, and means threaded into the collar and adapted to force the wedge against adjacent edges of the two members and into the space therebetween whereby the members are wedgingly clamped within the collar.

7. A clamp having in combination a collar provided with an opening for receiving two members which are to be clamped and held in fixed relation, a wedge, means threaded into the collar and adapted to force the wedge against adjacent edges of the two members and into the space therebetween whereby the members are wedgingly clamped within the collar, and locking means for holding the wedge in wedge position.

8. A clamp comprising a collar having an opening for receiving two spring bars which are to be clamped and held in fixed relation, a plurality of set screws threaded into the collar, each set screw having a cone-shaped tip for engaging adjacent edges of the two bars to wedge the same within the collar, and a locking nut for each set screw for locking the same in set position with the cone-shaped tip thereof in wedging contact with the two bars.

In witness whereof, I have hereunto subscribed my name.

WILLIAM A. STARCK.